Dec. 22, 1936.  H. HOWARD  2,064,833
COOLING OF LIQUIDS
Filed March 10, 1933  2 Sheets-Sheet 1
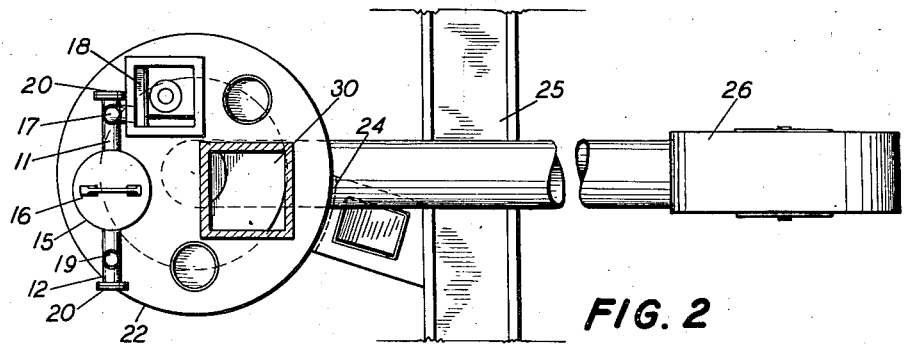
FIG. 2
FIG. 4
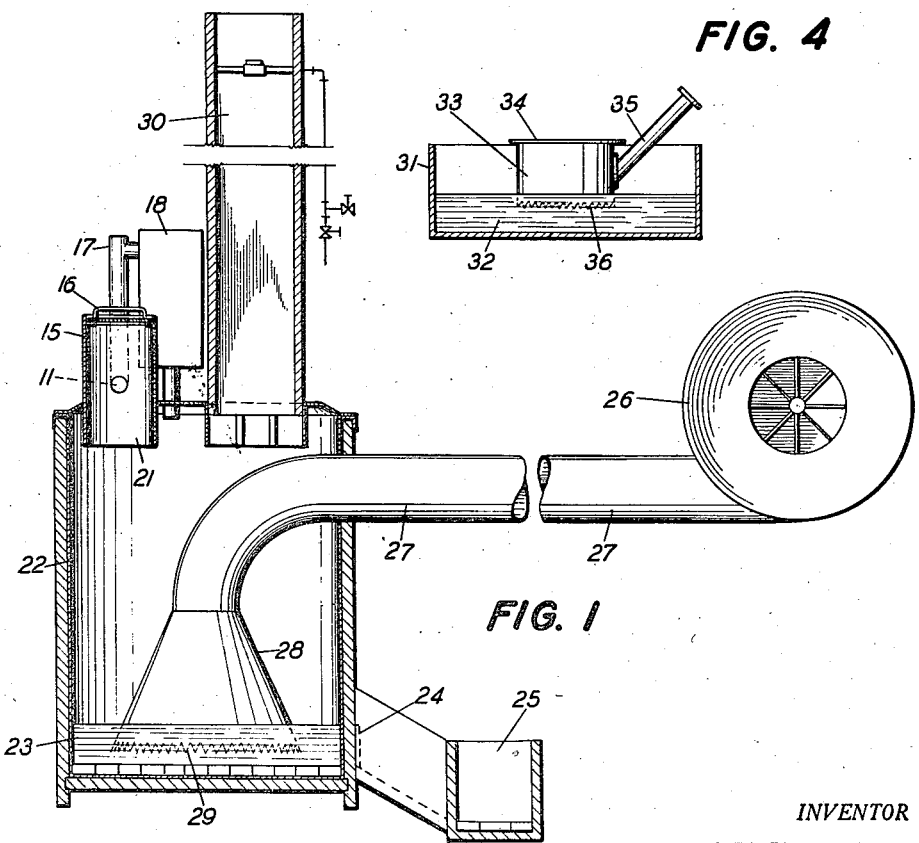
FIG. 1
INVENTOR
HENRY HOWARD
BY
ATTORNEY Dec. 22, 1936.                H. HOWARD                2,064,833
                            COOLING OF LIQUIDS
                         Filed March 10, 1933         2 Sheets-Sheet 2
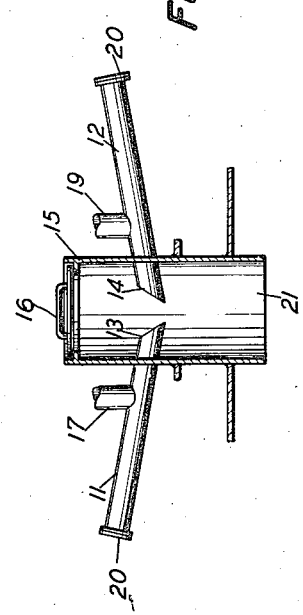
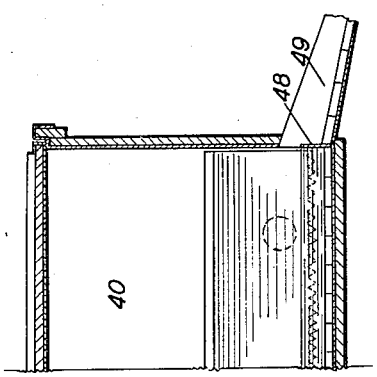
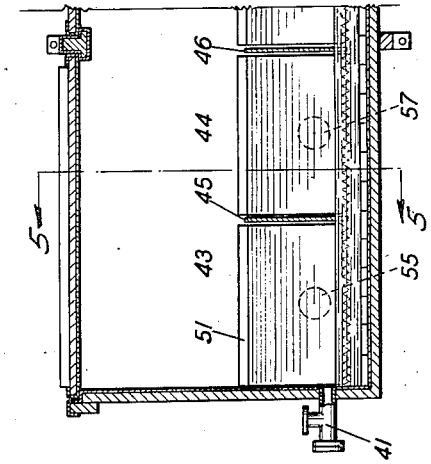
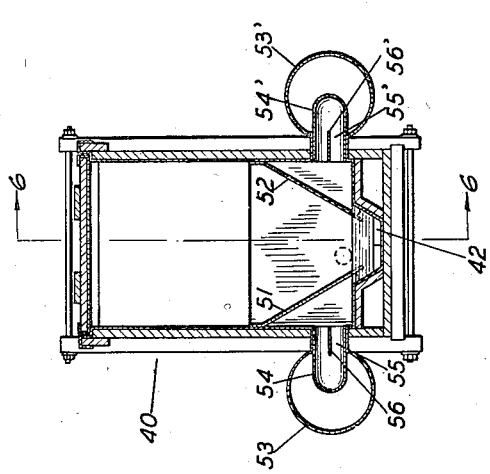
INVENTOR
HENRY HOWARD
BY *Arthur Middleton*
ATTORNEY Patented Dec. 22, 1936

2,064,833

UNITED STATES PATENT OFFICE 2,064,833

COOLING OF LIQUIDS

Henry Howard, Newport, R. I., assignor to The Dorr Company, Inc., New York, N. Y., a corporation of Delaware Application March 10, 1933, Serial No. 660,257
In Canada March 30, 1932

6 Claims. (Cl. 23—165)

This invention relates to devices for use in the treatment of liquids. More particularly, it pertains to the supplying to the liquid by bubbling therethrough a gaseous medium.

One object of this invention is to cool efficiently and cheaply a liquid or liquid mixture, which requires to be cooled. Another object is to cool a liquid which when cooled tends to precipitate on or scale up equipment, in such a manner that ill effects of scaling or encrusting are avoided. A further object is to combine a mixing action during cooling. Still another object is to cool a liquid progressively. More specifically, the object of the invention is to mix safely and quietly together hot dilute phosphoric acid with sulfuric acid while removing the heat generated thereby and providing a device that will not be encrusted by the precipitate of gypsum and sodium silico-fluoride which separate out from this mixture during the mixing and cooling thereof in the manufacture of phosphoric acid from phosphate rock. Other objects are also in mind which will be understood from a further reading hereof.

The nature of this invention resides in the design of an apparatus suitable for handling mixtures from which heat is desired to be transferred. The invention is particularly applicable in treating those mixtures from which heat cannot readily be removed by cooling coils or by transmission through the walls of the vessel owing to the rapid encrustations which soon prevent all flow of heat. The invention may be said to reside in an air distributing device having an edge immersed in the liquid to be cooled with means for providing the distributor with large volumes of preferably low pressure air bubbling up around the bottom edge of the distributor through the liquid to be cooled. The cooling air then escapes upwardly through the liquid. The agitation produced by the bubbling air tends to prevent any encrustation upon the distributor and the whole arrangement is so simple that if encrustation does take place on the distributor or the container for the liquid, it can easily be removed. Another feature of the invention lies in providing an undulating bottom edge formation on the distributor in the form of crenelations, serrations or the like to assure the more even distribution of the air around the submerged or immersed bottom edge of the distributor. The violent upward bubbling or boiling of the air through the liquid thoroughly mixes the components of the liquid mass.

When the invention is used for mixing and cooling phosphoric acid and sulfuric acid, the bubbling mixes the acids and steam produced carrying a considerable percentage of troublesome fluorine compounds which steam passes upwardly from the mixture where it can be exhausted or subsequently treated for their recovery. A small amount of heat is removed by the lower temperature of the cooling air but the principal reduction of heat in the liquid comes through the evaporation of water in the mixed acid being treated, and the latent heat is abstracted from the mixture as a result of this evaporation. The invention also resides in the details and combination of parts herein shown and described.

In a preferred and specific embodiment, the method of the invention is applied to the step of cooling the hot reaction slurry which is obtained in the making of phosphoric acid when phosphate rock is being disintegrated with phosphoric acid and the phosphate acid slurry dosed with sulfuric acid, which reaction is exothermic and the produced acid is saturated with certain impurities tending to precipitate and form troublesome incrustations when cooled. When cooling this hot reaction slurry or liquor in the manner proposed by this invention, a low pressure air current is impressed upon and into the surface of the hot liquid flowing through the cooling chamber. According to the method herein proposed, the impression of volumes of air upon the hot liquid is carried out in such a manner as to intensify circulation to and across the gas-liquid interface, whereby the interface is subjected to continuous disruptive effects, creating a rapid circulation or relative change of position of gas and liquid molecules with respect to the interface, which may for the purposes of this invention be called interfacial circulation. The effect is that despite a large air volume being introduced, the air is surprisingly rapidly heated and concurrently saturated, which saturation is commensurate with the temperature acquired, the heat required for vaporization being abstracted from the slurry to be cooled, thus obviating excessive temperature rise of the slurry due to the reaction.

A surprising effect can be seen in the fact that despite the brief actual contact of the large air volume with the liquid, it leaves the cooling chamber with a substantial degree of sensible heat and water vapor, sensible as well as latent heat having been abstracted from the liquid during the brief period of induced or impressed and intensified interfacial contact.

It may be said that this invention solves the cooling problem which is special with a liquor or slurry of the character described, by taking into consideration the importance of the interfacial relation of the media involved and taking advantage of the overwhelming urge of liquid molecules to evaporate if given a chance by intensified interfacial circulation.

So that the invention may be clearly understood there is shown for illustrative purposes in the accompanying drawings one proposed embodiment of the invention. In the drawings, Figure 1 shows, more or less diagrammatically a vertical section view of one embodiment of this invention for treating mixed phosphoric and sulfuric acids, as specially designed for use in a plant for leaching phosphate rock with acid such as sulfuric as a step in the production of phosphoric acid. Figure 2 shows diagrammatically, a plan view of the device of Figure 1. Figure 3 shows a vertical sectional view of the acid feeding device. Figure 4 shows a side elevation, with parts in section of a modified form of distributor. Figure 5 shows a vertical cross sectional view through a modified form of cooler taken along the line a—a of Fig. 6, while Figure 6 shows a transverse sectional view of the device in Figure 5 taken along the line b—b of Fig. 5.

While the invention has broad applicability to the cooling of liquids and to the combined mixing and cooling of liquids, it was specifically designed for cooling and mixing phosphoric acid and sulfuric acid for use in a plant where phosphoric rock is leached with sulfuric acid. Accordingly, the device will be described so that the principles on which it operates will be apparent.

Hot dilute phosphoric acid is to be mixed with strongly concentrated sulfuric acid. This is done in a device shown particularly in Figure 3. It consists essentially of two acid resisting inclined pipes 11 and 12 whose ends 13 and 14 respectively come together in juxtaposition in a casing or mixing head 15 having an inspection permitting cover 16. Phosphoric acid is fed to pipe 11 through feed pipe 17 from some suitable measuring device 18. The sulfuric acid is fed to pipe 12 through feed pipe 19 from appropriately controlled source of supply. Each pipe 11 and 12 is provided with a blind flange 20 for clean-out purposes. The two acids are intermingled with each other in falling from the ends of their respective pipes 11 and 12 by impinging upon each other.

The acid feeding casing 15 is open at its bottom 21 but is so supported upon the main mixer-cooler tank or station 22 (which is preferably covered) that the roughly mixed acids fall from the acid feeding casing 21 directly into the tank 22.

The acids to be further mixed and cooled in tank 22 form a pool or bath 23 therein, the depth of which is controlled by a dam or weir 24, over which the finished or mixed and cooled acid together with its precipitate flows to a launder 25 which conveys it to a place of storage or use.

Means are provided for bubbling air through the pool of liquid in the cooler tank which constitute, in this embodiment of the invention, a fan or blower for forcing air through a conduit 27 which enters tank 22 and terminates in a conical distributor or head 28 open at its bottom but having its bottom edge serrated, crenelated or otherwise made undulatory or zigzag.

This serrated bottom edge 29 is submerged preferably to a depth of three inches in the pool of liquid to be treated. The capacities of the fan 26 and conduit 27 are so correlated that large volumes of low pressure air can be caused to bubble or boil around the immersed serrated edges 29 of the distributor cone or head 28 and to pass upwardly through the liquid to be cooled.

More generally speaking, a low pressure air current is introduced slightly below the surface of the liquid or slurry by causing it to pass under a slightly immersed edge and bubble up through the top portion only of the slurry causing rapid evaporation of some of the water present which results in rapid cooling of the slurry, and whereby air pressure, air volume and velocity of air flow through the liquid are so coordinated with the depth of immersion of said edge as to avoid substantially any considerable quantity of air passing under said edge without bubbling up through the liquid to be cooled.

The air escaping upwardly through the pool of liquid 23 is conducted away from the cooler tank 22 by means of a stack 30 or other suitable flue.

The roughly mixed acids from the acid feeding casing 15 fall into the cooler tank 22 where they form into a pool or bath 23, the liquid level of which is controlled by weir 24. Large volumes of preferably low pressure air are bubbled up through the acids in the pool 23 in the bottom of cooler tank 22. The air bubbles or boils upwardly so violently around the immersed distributor cone or head 28 that few encrustations form and all the solids which are precipitated appear to pass out of the cooler 22 with the mixed acid overflowing weir 24 into launder 25. This violent boiling thoroughly mixes the acid from the mixer head 21 and the steam, arising from the mixture in the cooler tank 22 mixed with a considerable percentage of hydro-fluo-silicic acid passes out through the ventilating flue or stack 30. This is an important result obtained from carrying out my invention in a phosphate plant because the fluorine compounds in the rock cause trouble in the plant unless they are promptly removed. My cooler is effective in thus eliminating them from the system before they can do harm. The hydro-fluo-silicic acid may be recovered if desired.

The air continuously bubbling up through the liquid mixture comes in contact with fresh surfaces of the material to be cooled so that encrustations upon the apparatus do not occur. The air cools principally by evaporating the water in the mixed acid, and then by abstracting or absorbing the latent heat released by this evaporation. In the form of cooler just described when used on a mixture of hot phosphoric acid and concentrated sulfuric acid, the temperature of the mixed acid in the cooler remained fairly constant at 70° C. In such a case, the amount of cooling the acid required depends principally upon the vapor pressure of the acid at 70° C. and the volume of air passed through the acid, but in spite of the fact that in one specific instance the acid entered the cooler at 95° C. this higher temperature was at once lowered to 70° C. which was the temperature of the acid in the pool in the cooler. The air steadily passing through the acid in the pool abstracts enough heat to maintain the acid in the pool at the 70° C. temperature.

In the specific instance referred to, with a capacity of 30 imperial gallons per minute and 1000 cu. ft. of air per minute flowing through the cooler, the temperature of the acid was reduced from 95° C. to 70° C. while the power required for handling this amount of air was approximately 3½ H. P.

The form of the distributor head or cone 28 obviously can be modified in many ways, one of which is shown in Figure 4 wherein the cooling tank is indicated by 31 having a bath or pool 32 of mixed acid to be cooled. 33 indicates the modified distributor head which instead of being conical like distributor head 28, is either cylindrical as shown or rectangular, with a top 34 and a neck 35 through which the air is supplied to the interior of the head 33. The head is open-bottomed and provided with serrated edges 36 similar to those (29) on the head 28.

The cooler arrangements above described have been designed to cool the liquid in a single stage or step. However, there are places and circumstances where a liquid must be cooled to an extent not possible to carry out in a single stage. To that end I have devised an arrangement, which while using the same principles as described for the devices shown in Figs. 1 to 4, is capable of cooling progressively or in a plurality of stages. Whereas, the previously described devices have in practice cooled liquid from 95° C. to 70° C., the modification of my invention hereinafter described will cool liquid from 95° C. or 92° C. down to 25° C. or less. The theory on which the following described embodiment of this invention operates is that it is desired to have the liquid whose temperature is being reduced progressively meet large volumes of cooling air. The cooling thus obtained is due largely to the latent heat of evaporation and the hotter the liquid, the more rapid the evaporation becomes. Thus more rapid cooling results from a given volume of air passing through the liquid.

The modification shown in Figures 5 and 6 consists essentially of a plurality of zones or stages through which flows the acid or liquid to be cooled, and in such zone or stage the flowing liquid is exposed to large volumes of low pressure air which is bubbled up through the acid. Thus the flowing acid is progressively exposed to successive air-cooling treatment.

To this end I provide a cooler tank 40 (which is preferably covered) into which the hot acid or liquid to be cooled is fed at 41. The acid flows through the tank 40 preferably along a trough 42 which may be lined with acid-proof brick or tile. The tank is divided into a plurality of zones, stages or compartments 43, 44 etc. by means of suitable divisional walls or other partitions 45.

The acid or liquid flows through these stages 43, 44, etc. uninterruptedly but a pool or bath 47 of the acid is maintained in the tank 40 at any desired depth by means of a dam or weir 48 over which the cooled acid flows and is conveyed away by means of a launder 49. 50 indicates a flue or stack for the tank 40 to convey away obnoxious fumes or other gases.

Each compartment, such as 43, is provided with air distributing plates partially submerged or immersed in the acid, the function of which corresponds to that of the distributor cone or head 28 in Figure 1. I prefer to use, in this embodiment, a pair of plates 51 and 52 suitably supported such as from the walls of the tank 40, extending therefrom into the acid to be cooled which flows in trough 42. The bottom edges of the plates 51 and 52 may be serrated, if desired, as shown in connection with the distributor cone 28.

Air is caused to bubble up under or around the immersed bottom edge of the plate 51, for instance, from a conduit to which air under pressure is provided. Air from the conduit is drawn in by means of a deflecting device such as a scoop 54, and passed through a duct 55 extending through the wall of the tank 40. The passage of the air through the duct 55 may be controlled by some damper means 56.

Each of the compartments 43, 44 and so on, may have air fed to them by a single conduit 53 common to each but each compartment such as 44 may have a duct 57 leading the air to it from the conduit in the same way that duct 55 leads air to compartment 43 from the conduit 53.

The air distributing plate 52 is provided with air supplying means which are the same as those used in connection with plate 51, so the corresponding element will be indicated by primed reference numerals.

The bottom edges of the air distributing plates may or may not be serrated or saw-toothed, but my preference is to have the edge serrated so as to break up the air column, increase the area of gas-liquid interface and to insure substantially uniform distribution of the air. The air bubbles up around the bottom edge of the distribution plates and through the liquid whereby the liquid is cooled as previously described. Each compartment, such as 43 and 44, having a duct such as 55 to convey air to the distributor plate of that compartment, is shown to be equipped with a damper means 56 so that the proportion of air being supplied to each compartment can be definitely controlled.

This embodiment of my invention is designed to handle from 20,000 to 24,000 cubic feet of air per minute, delivered at a pressure sufficient to give this volume against the pressure produced by forcing the air under the two or three inches of acid or liquid to be cooled. The result is violent boiling of the acid caused by the air escaping under the bottom edges of distributor plates 51 and 51'. This boiling is so rapid that any precipitate which may be formed during the cooling process will be kept in suspension and will flow along with the acid to the outlet over the weir 49. Nevertheless, in case any encrustation does occur, it can be removed readily for the cooler has been designed for accessibility.

This embodiment of the invention thus permits the progressive cooling of the liquid before being cooled by fresh additions of the cooling medium, and permits the continuous and instantaneous removal of the evaporated steam, the result being that the power requirements for furnishing air for a definite amount of cooling are less than in the customary types of coolers where there is a countercurrent heat exchange. Moreover, this invention is particularly applicable for use on liquids wherein encrustation and precipitation occurs during cooling because of my bubbling or boiling action which tends to sweep the precipitate along with the liquid instead of letting it encrust on the cooler.

Several embodiments of my invention have been shown and described in an illustrative sense but not a limiting one, for obviously many modifications including rearrangement, different combinations and substitution of parts can be made without departing from the spirit and scope of the claims herein. For instance, the device shown and described herein can be used as an evaporator by having the air being bubbled through the liquid heating instead of cooling.

I claim:

1. A method for cooling a slurry in a continuous manner, which method comprises causing contact of a low pressure air current with the slurry by introducing the air slightly below the surface and causing it to bubble through the top portion only of the slurry thereby producing rapid evaporation of some of the water present and resulting in rapid cooling of the slurry.

2. A method for cooling a slurry in a continuous manner, which method comprises causing contact of a low pressure air current with the slurry in a manner whereby the air is introduced slightly below the surface by causing it to pass under a slightly immersed edge and bubble up through the top portion only of the slurry causing rapid evaporation of some of the water present thus resulting in rapid cooling of the slurry, and whereby air pressure, air volume and velocity of air flow through the liquid are so coordinated with the depth of immersion of said edge as to avoid substantially any considerable quantity of air passing under said edge without bubbling up through the liquid to be cooled.

3. In the process of making phosphoric acid from phosphate rock slurry in which exothermic heat is produced by the dilution of strong sulfuric acid and by the reaction between sulfuric acid and phosphate rock, a method for cooling the slurry undergoing reaction, which method comprises causing contact of a low pressure air current with the slurry by impressing the current upon and into the surface of the slurry in a manner whereby the gas liquid interface is subjected to continuous disruptive effects and whereby a rapid circulation of the gas and the liquid to, along, and from the interface is effected, said induced interfacial circulation being effective to heat the air with concurrent saturation of the air commensurate with the temperature acquired, whereby the latent heat of vaporization is abstracted from said slurry, and according to which method air is used in sufficient quantity to maintain the reaction slurry at temperatures approximating 70° C.

4. A method for cooling in a continuous manner a slurry produced in the making of phosphoric acid from phosphate rock, in which slurry exothermic heat is produced as a consequence of the dilution of strong sulfuric acid and the reaction between sulfuric acid and phosphate rock, which method comprises causing contact of a low pressure air current with the slurry by impressing the current upon and into the surface of the slurry in a manner whereby the gas-liquid interface is subjected to continuous disruptive effects and whereby a rapid circulation of the gas and the liquid to, along and from the interface is effected, said induced interfacial circulation being effective to rapidly heat the air with concurrent saturation of the air commensurate with the temperature acquired whereby the latent heat of vaporization is abstracted from said slurry.

5. A method for cooling in a continuous manner a slurry produced in the making of phosphoric acid from phosphate rock, in which exothermic heat is produced as a consequence of the mixing of dilute phosphoric acid and sulfuric acid, which method comprises causing contact of a low pressure air current with a stream of the slurry to be treated by impressing the current upon and into the surface of the slurry in a manner whereby the gas-liquid interface is subjected to continuous disruptive effects and whereby a rapid circulation of the gas and the liquid to, along, and from the interface is effected, said induced interfacial circulation to effect rapid heating of the air with concurrent saturation of the air commensurate with the temperature acquired whereby the latent heat of vaporization is abstracted from said slurry, which said induced contact is effected by bubbling the air through said slurry and around an immersed edge in successive zones along said stream so as to effect a progressive stagewise cooling thereof.

6. A method for cooling in a continuous manner a slurry produced in the making of phosphoric acid from phosphate rock, in which slurry exothermic heat is produced as a consequence of the mixing of dilute phosphoric acid with sulfuric acid, which method comprises causing contact of a low pressure air current with the slurry by impressing the current upon and into the surface of the slurry in a manner whereby the gas liquid interface is subjected to continuous disruptive effects and whereby a rapid circulation of the gas and the liquid to, along, and from the interface is effected, said induced interfacial circulation being to effect rapid heating of the air with concurrent saturation of the air commensurate with the temperature acquired whereby the latent heat of vaporization is abstracted from said slurry, which said induced contact is effected by bubbling the air through said slurry around an immersed edge.

HENRY HOWARD.